United States Patent
Bai

(10) Patent No.: US 6,695,111 B1
(45) Date of Patent: Feb. 24, 2004

(54) TORQUE CONVERTER AND CLUTCH CONTROL

(75) Inventor: Shushan Bai, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/211,871

(22) Filed: Aug. 2, 2002

(51) Int. Cl.$^7$ .............................................. F16H 61/14
(52) U.S. Cl. ...................................................... 192/3.3
(58) Field of Search ............................. 192/3.29, 3.3; 137/596.15, 625.69; 477/62

(56) References Cited

U.S. PATENT DOCUMENTS

| | | | |
|---|---|---|---|
| 4,437,358 A | * 3/1984 | Kubo et al. .................... | 477/62 |
| 4,458,720 A | * 7/1984 | Gierer ........................ | 192/3.31 |
| 4,662,488 A | * 5/1987 | Hiramatsu et al. ............. | 477/62 |
| 4,890,707 A | * 1/1990 | Suzuki ........................ | 192/3.3 |
| 4,998,604 A | * 3/1991 | Vukovich et al. ............. | 192/3.3 |
| 5,086,894 A | * 2/1992 | Iizuka et al. ................ | 192/3.29 |
| 5,701,982 A | * 12/1997 | Nakatani et al. ............. | 192/3.3 |
| 5,802,490 A | * 9/1998 | Droste ........................ | 192/3.3 |
| 6,296,019 B1 | * 10/2001 | Muller et al. .......... | 137/625.69 |

FOREIGN PATENT DOCUMENTS

WO   WO 99/10666 A1 * 3/1999

* cited by examiner

*Primary Examiner*—Rodney H. Bonck
(74) *Attorney, Agent, or Firm*—Leslie C. Hodges

(57) ABSTRACT

A torque converter clutch control valve has a single valve element for controlling the fluid distribution to and from a torque converter and clutch assembly to establish clutch engagement and disengagement as well as torque converter operation. The control valve has one position for supplying fluid to release the clutch and simultaneously feed the torque converter, and another position to supply a pressure controlled fluid to engage the clutch. A force motor control valve is provided to control the pressure level of the clutch engagement pressure.

4 Claims, 1 Drawing Sheet

TORQUE CONVERTER AND CLUTCH CONTROL

TECHNICAL FIELD

This invention relates to control valves and, more particularly, to control valves for providing fluid flow to and from a torque converter and clutch assembly.

BACKGROUND OF THE INVENTION

In current transmissions employing torque converters, most of these mechanisms employ what is termed a torque converter clutch. The torque converter clutch is a selectively engageable mechanism that places the torque converter in a 1:1 drive condition thereby improving the overall efficiency of the transmission.

The torque converter is a hydrodynamic assembly, which requires fluid for the proper operation thereof. When a clutch is added to the torque converter, such that a torque converter and clutch assembly is attained, the fluid pressure to the torque converter must also apply and release the torque converter clutch.

In present transmissions, the fluid fed to the torque converter and clutch assembly is controlled by a torque converter regulator valve and a torque converter control valve. The torque converter regulator valve controls the level of pressure needed to apply the torque converter clutch and the torque converter control valve determines the direction of flow through the torque converter. In other words, the torque converter regulator apply clutch is a downstream regulator valve and the torque converter control valve is a directional valve.

With the use of two valves, it is required that the transmission have two valve spools, two separate valve bores and fluid transfer channel which interconnect these two valve spools.

SUMMARY OF THE INVENTION

It is an object of the present invention to provide a torque converter clutch control mechanism having a single valve spool element.

In one aspect of the present invention, the torque converter clutch control mechanism supplies fluid pressure from a conventional transmission regulator valve to one area of a torque converter and clutch assembly and returns fluid from the torque converter and clutch assembly to a fluid cooler.

In another aspect of the present invention, the valve spool of the torque converter clutch control mechanism is directed to a second position wherein a regulated pressure is emitted from the torque converter clutch and control mechanism and supplies fluid pressure to another area of the torque converter assembly.

In a further aspect of the present invention, in a release condition, the torque converter clutch control mechanism supplies fluid pressure to a release side of the torque converter and clutch assembly and return fluid is directed from an apply side of the torque converter and clutch assembly to a transmission cooler.

In a still further aspect of the present invention, in an apply condition, the torque converter clutch control mechanism supplies a regulated pressure to the apply side of the torque converter and clutch assembly and return fluid is directed from the release side of torque converter and clutch assembly to a fluid reservoir.

In yet still another aspect of the present invention, the torque converter clutch control mechanism includes a force motor control member which determines the apply and release positions of the spool valve of the torque converter clutch control mechanism and also supplies a bias pressure for the regulation of fluid pressure to the torque converter during the apply condition.

DESCRIPTION OF AN EXEMPLARY EMBODIMENT

Figure 1:
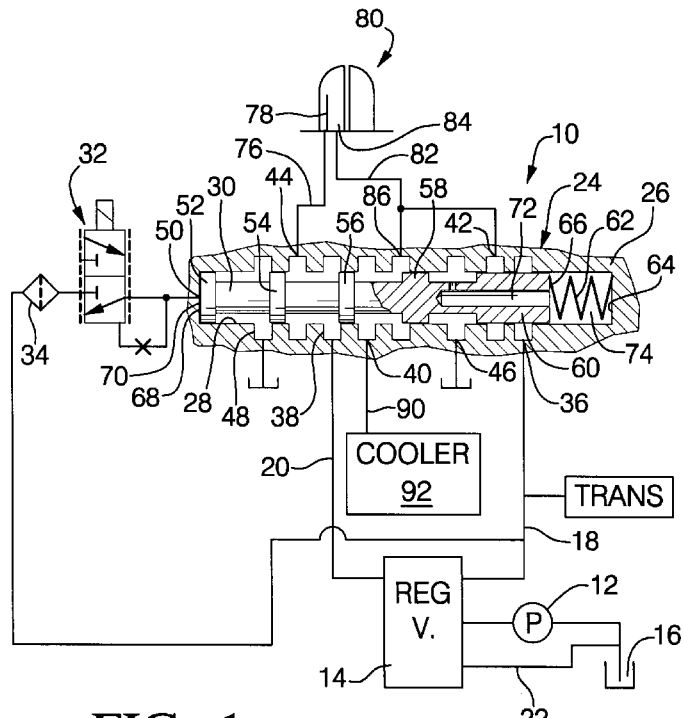
FIG. 1 is a diagrammatic representation of a portion of a transmission control mechanism depicting an embodiment of the present invention shown in one position of operation.

Referring to the drawings, wherein like characters represent the same or corresponding parts throughout the several views, there is seen in FIG. 1 a control portion 10 of a transmission control system, which includes a positive displacement pump 12 and a conventional regulator valve 14. The pump 12 draws fluid from a transmission sump or reservoir 16 and delivers fluid to the regulator valve 14.

The regulator valve 14 supplies a number of control pressures. The first control pressure is supplied to a main passage 18, which is the maximum pressure within the system. The fluid in passage 18 is supplied to the main transmission control for operating the clutches and brakes and other devices within the transmission as well as providing lubrication and cooling fluid. A second control pressure is directed from the regulator valve 14 through a passage 20, which supplies a reduced pressure and is termed a torque converter feed pressure.

The regulator valve 14 sends excess fluid from the regulator valve 14 back to the inlet of the pump 12 through a passage 22. In some transmission control regulator valves, the passage 22 is omitted and the pump 12 is a conventional variable displacement pump wherein the excess fluid of the regulator valve is directed to a conventional displacement control formed in the pump assembly, which is effective to reduce the pump displacement and thereby eliminate the excess flow capacity. The fluid pressure in passage 18 is also communicated to a torque converter clutch control mechanism 24. The fluid in passage 20 is also directed to the control mechanism 24.

The control mechanism 24 includes a valve body 26 having a valve bore 28 formed therein and a valve spool 30 slidably disposed within the valve bore 28. The control mechanism 24 also includes a force motor control valve 32, which is a conventional control mechanism used in many transmission control systems. The control valve 32 receives oil from the passage 18 through a filter element 34.

The valve body 26 includes an inlet line port 36, an inlet converter feed port 38, a cooler outlet port 40, a torque converter clutch apply port 42, a torque converter clutch release port 44, a pair of exhaust ports 46 and 48, a control port 50. The valve spool 30 includes a plurality of equal diameter lands 52, 54, 56, 58, and 60.

A spring member 62 is disposed between one end 64 of the valve bore 28 and an end 66 of the valve spool 30. The spring 62 urges the valve spool 30 toward the other end 68 of the valve bore 28. The valve land 52 cooperates with the end 68 to form a control chamber 70, which is disposed in fluid communication through the port 50 with the force motor control valve 32.

The valve land 54 controls fluid communication between the port 44 and the port 48. The valve land 56 controls fluid communication between the port 38 and the port 44, and also between the port 38 and the port 40. The valve land 58 controls the opening and closing of port 46. The valve land 60, which is an extended length valve land, controls fluid flow between the port 36 and the port 42.

An internal passage 72 is formed in the valve spool 30 and provides a fluid connection between the port 42 and a chamber 74 formed between the end of valve land 60 and the end of end 64 of the valve bore 28. This chamber 74 surrounds and encloses the spring 62.

The port 44 is connected to a release passage 76, which is also connected with a release side 78 of a conventional torque converter and clutch assembly 80. The port 42 is communicated with an apply passage 82 which also communicates with an apply side 84 of the torque converter and clutch 80. The apply passage 82 also communicates with a port 86 formed in the valve bore 28. The port 86 is controlled by the valve lands 56 and 58, which open and close the passage 82 to the port 40 for return of fluid through a passage 90 to a conventional transmission cooler 92.

The force motor control valve 32 has a spring set position in which the fluid pressure in the chamber 70 is exhausted to the sump 16. The valve 32 also has a regulating position, which controls an elevated fluid pressure in the chamber 70. The fluid pressure in chamber 70 is controlled at various levels depending upon the operating conditions of the transmission. The use of a force motor for controlling pressures and regulator valves is well known in the art. This control valve will control the fluid pressure in chamber 70 through a range of pressure levels such that the apply pressure of the torque converter clutch can be regulated to the desired levels of operation.

In the position shown in FIG. 1, the control mechanism 10 is in the release condition such that fluid pressure in passage 18 is blocked by the land 60, fluid pressure between lands 60 and 58 is connected with the port 46 and directs any fluid therein to the transmission sump 16, the port 86 and therefore apply passage 82 is connected with the transmission cooler 92 through ports 86 and 40. The torque converter feed passage 20 is directed through ports 38 and 44 to the release side 78 of the torque converter and clutch assembly 80. In this condition, operating fluid is communicated with the torque converter and clutch assembly 80 through the release side of the assembly and returned through the control portion 10 through the transmission cooler 92 through the apply side. As is well known in reverse flow type torque converter clutch mechanisms, this flow direction will cause the torque converter clutch to be disengaged and the torque converter to operate as a hydrodynamic device in which considerable slippage might occur at higher torque levels.

Figure 2:
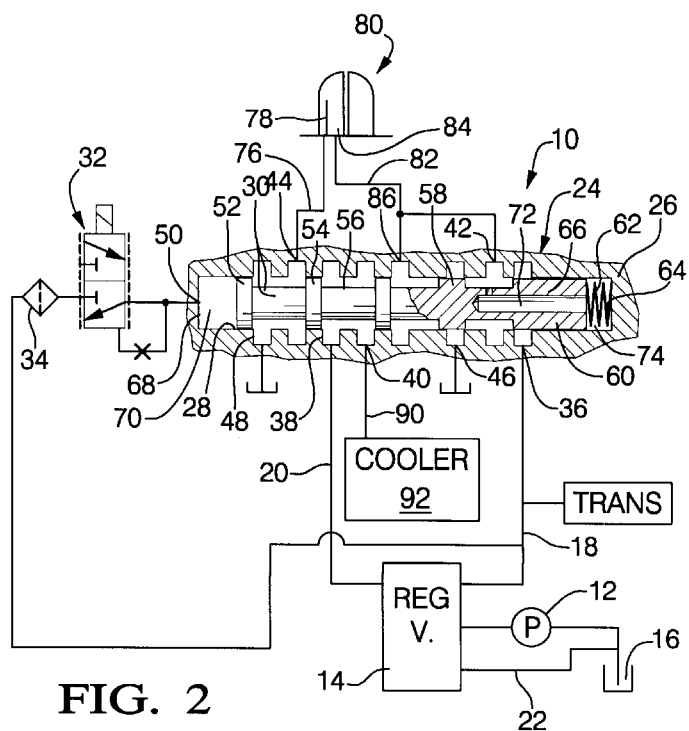
FIG. 2 is a diagrammatic representation similar to FIG. 1 depicting the transmission control mechanism in another operating position.

When it is desired to engage the torque converter clutch thereby improving the efficiency of the transmission, the force motor control 32 issues a signal to the chamber 70, which moves the torque converter clutch control mechanism 24 the apply position shown in FIG. 2. Under this condition, the apply passage 82 is connected with the space between lands 58 and 60 through the port 42 while the port 86 is closed by the valve lands 56 and 58. The torque converter feed passage 20 is communicated between the lands 56 and 54 through the transmission cooler 92 and the release passage 76 is communicated through the ports 44 and 48 to the transmission sump 16.

The pressure in chamber 70 is determined by the operating conditions of the transmission. That is, if more torque is required by the powertrain, the pressure in passage 70 will increase. The pressure in the apply passage 82 is a function of fluid pressure in the chamber 74, which is directly connected with the space between the lands 58 and 60, the spring 62, and the pressure in the chamber 70. The pressure in chamber 74 will urge the valve spool 30 leftward to reduce the incoming flow in passage 18 while increasing the outgoing flow to port 46 thereby reducing the pressure in passage 82. The valve spool 30 will find the position controlled by the pressure in chamber 70, the pressure in chamber 74, and the spring 62 so that a reduced pressure from the main passage 18 to the apply 82 is provided through the torque converter and clutch assembly 80. This pressure is, as previously described, directed to the apply side of the torque converter and clutch assembly 80 thereby applying the clutch and eliminating the slippage normally associated with hydrodynamic torque transfer mechanisms.

As will now be readily apparent to those skilled in the art, the control of fluid directed to and from the torque converter and clutch assembly 80 is established by a single valve spool element; namely valve spool 30, of the valve control portion 10.

Obviously, many modifications and variations are possible in light of the above description. Therefore, the present invention is to be limited only by the appended claims.

What is claimed is:

1. A torque converter and clutch control comprising:
   a torque converter and clutch assembly having an apply feed passage and a release feed passage;
   a source of fluid pressure, said source supplying a system pressure and a torque converter feed pressure;
   a torque converter and clutch control valve including a valve body and a valve spool slidably disposed in said valve body, said valve body communicating with said system pressure and said torque converter feed pressure, said valve spool being positionable in a first position in said valve body to distribute said torque converter feed pressure to said release feed passage and to return fluid from said apply feed passage to a return passage, and positionable to a regulating position to distribute a regulated pressure level fluid from said source of system pressure to said apply feed passage to regulate an engagement force in a clutch in said torque converter and clutch assembly, to return fluid from said release feed passage to a sump, and to direct said torque converter feed pressure to said return passage.

2. The torque converter and clutch control defined in claim 1 further comprising:
   means for controlling the position of said valve spool to said first position and to said regulating position.

3. The torque converter and clutch control defined in claim 2 further comprising:
   said means for controlling including spring means for urging said valve spool toward said first position and a fluid chamber for urging said valve spool toward said regulating position.

4. The torque converter and clutch control defined in claim 3 further comprising:
   means for supplying a regulating control pressure to said chamber to establish said regulating position and to control the pressure level of said regulated pressure level fluid.

* * * * *